Figure 3:
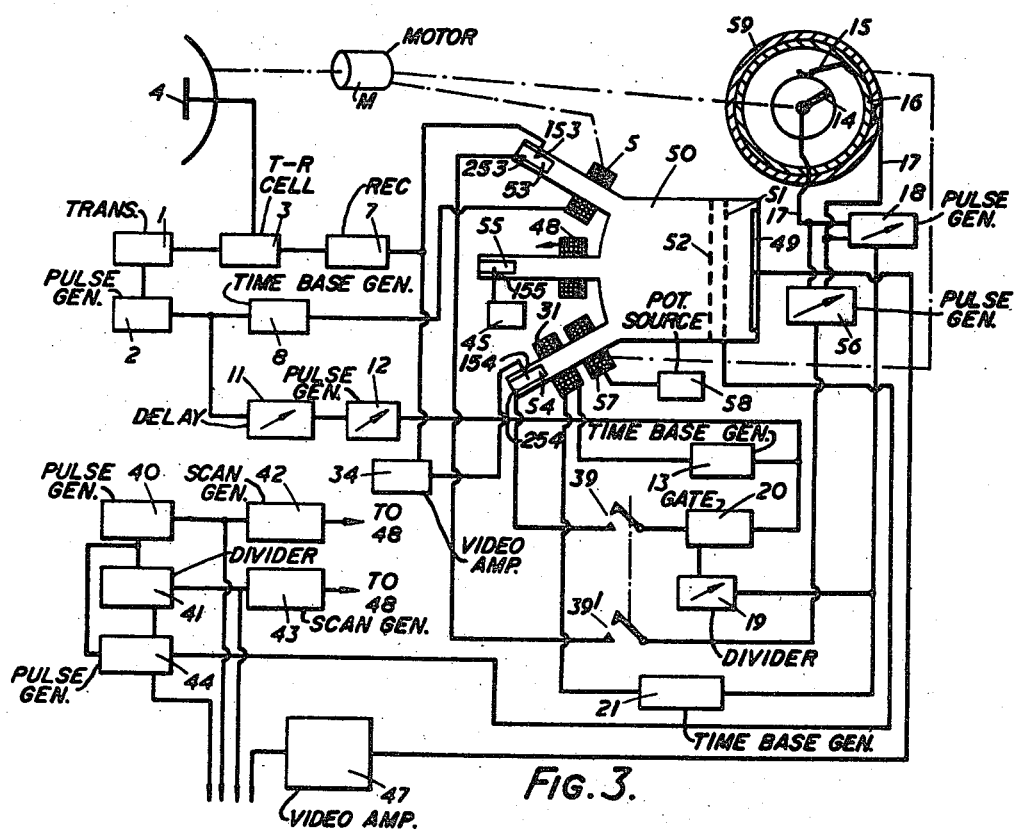

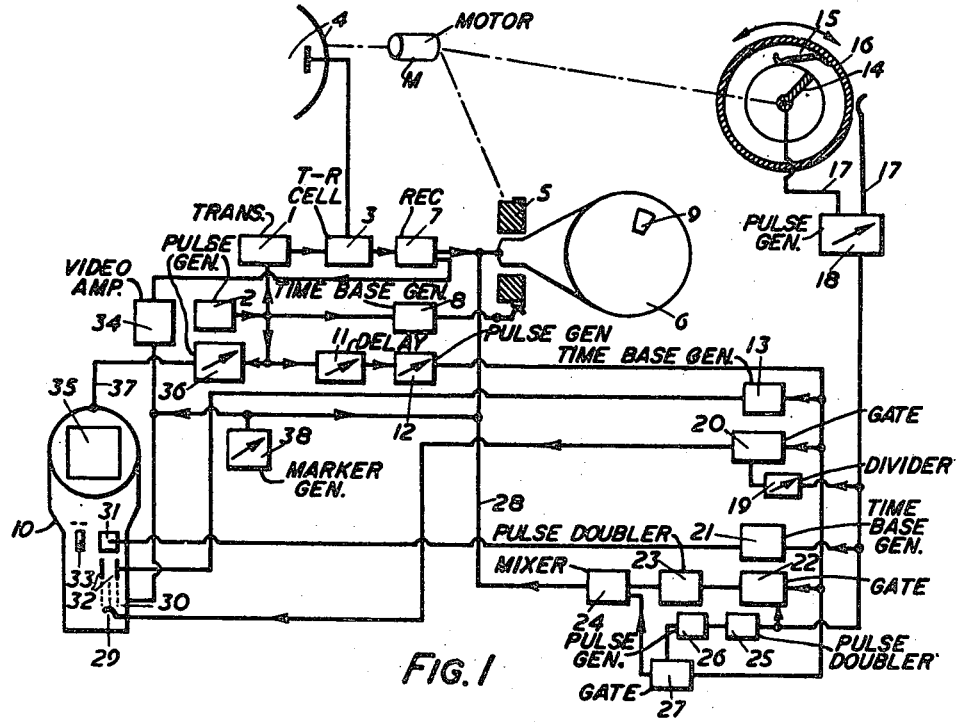
FIG. I
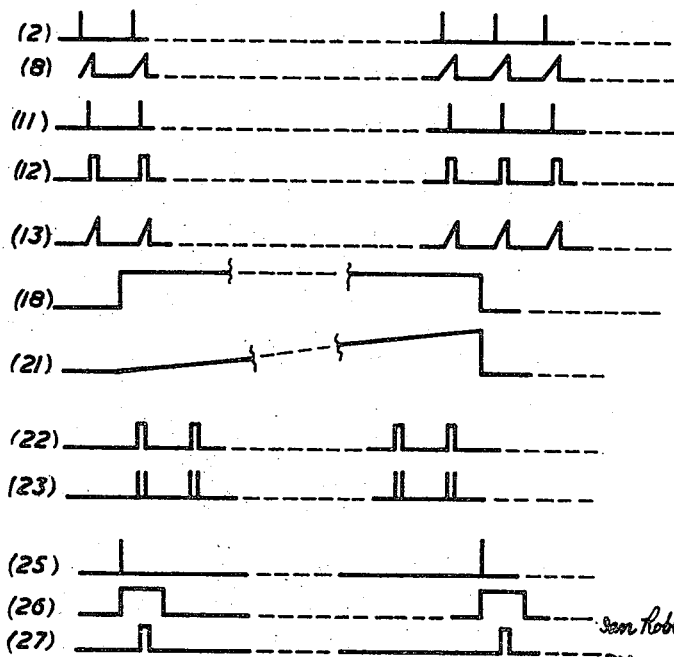
FIG. 2
INVENTOR
Ian Robertson Sinclair
BY Baldwin & Wight
ATTORNEYS June 15, 1965  IAN ROBERTSON SINCLAIR  3,189,897
RADAR SYSTEMS
Filed July 26, 1961  2 Sheets-Sheet 2

INVENTOR
Ian Robertson Sinclair
BY Baldwin & Wight
ATTORNEYS

3,189,897
RADAR SYSTEMS

Ian Robertson Sinclair, Chelmsford, England, assignor to English Electric Valve Company Limited, London, England
Filed July 26, 1961, Ser. No. 126,968
Claims priority, application Great Britain, Nov. 28, 1960, 40,811/60
15 Claims. (Cl. 343—11)

This invention relates to radar systems and, though not limited to its application thereto, is primarily intended for ship-borne radar systems.

Two ships are on collision courses when the bearing of each from the other remains constant and, with known radar sets giving plan-position indicating (P.P.I.) displays as at present in general use, a navigating officer navigating in a seamanlike manner has in practice to plot the target indications of another ship as given by his radar set in order to determine, with an accuracy sufficient for safety, what the relative course of that other ship is and whether it is on a collision course or not. Sometimes this plotting is done on paper at the chart table. Sometimes the P.P.I. display tube has a transparent reflector-type plotting device fitted over it so that the navigating officer can plot directly on the plotting surface of this device with a china-glass pencil. In either event the plotting is tedious, occupies practically the whole attention of an officer while it is going on, calls for considerable accuracy and concentration, and involves the elapse of a considerable time before the officer receives enough information to enable him reliably to determine the relative course of the other ship and whether he should take avoiding action or not. It is believed that a substantial number of collisions have occurred due to failures of navigating officers to plot information given by their radar sets or to plot such information correctly and in sufficient time to avoid collision. A radar set providing a display which could be arranged to show quickly and without plotting the relative course of another ship and whether it was on a collision course or not would be of great practical advantage at sea, especially to the many ships which have only limited numbers of watch-keeping and navigating officers. The present invention seeks to provide such radar sets and also to provide equipment which can be added to existing ordinary P.P.I. display radar sets to transform them into such sets.

According to a feature of this invention a radar set comprises an electron discharge storage tube having a signal storing electrode, means for displaying signals stored by said electrode, means for storing on said electrode echo signals derived from targets within the coverage of said set, means for storing on said electrode separately from the aforesaid echo signals, echo signals derived from targets within a relatively small portion of the coverage of said set and means for moving the position of said relatively small portion within said coverage.

The storage tube may be a direct view storage tube in which case the means for displaying signals stored on the storage electrode thereof will include, in said tube, a display screen and means for displaying on said screen the said stored signals. Alternatively, the storage tube may be provided with a signal electrode adapted to provide output signals corresponding to the stored signals, in which case display means, additional to the storage tube, are provided for displaying, for example in television fashion, said output signals.

The separate storage of echo signals from targets within said relatively small portion and the first-mentioned echo signals may be achieved by providing means, operable at will, for preventing storage of said first-mentioned signals due to targets within at least part of the coverage of the set and for initiating storage of echo signals from targets within said relatively small portion on the part of the storage electrode on which storage of said first-mentioned signals is prevented.

Alternatively, said first-mentioned echo signals and said echo signals from targets within said relatively small portion may be stored on different parts of the storage electrode of the tube.

Preferably said first-mentioned echo signals are stored in said tube in a manner to provide polar co-ordinate (i.e. P.P.I.) display and preferably the echo signals from targets within said relatively small portion are stored in a manner to provide rectangular co-ordinate (i.e. B-scan) display.

According to a subsidiary feature of this invention a radar set comprises means for scanning space with periodic radio pulses to derive echo signals from targets within said space; a receiver for receiving said echo signals; an electron discharge storage tube having two writing electron guns and a reading electron gun; means for applying received signals to modulate the beam of one of said writing guns and means for deflecting said beam to store on a storage electrode of said tube a charge representation of scanned targets within the coverage of said set and corresponding as respects bearings in relation to the origin of said representation and distances therefrom to the bearings and ranges of said targets; means, including means for modulating and deflecting the beam of the other writing gun, and operable at will for storing on said storage electrode a co-ordinate charge representation of targets lying within a selectable, relatively small, portion of the coverage of said set, one co-ordinate corresponding to bearing and the other to range; means, operable conjointly with said storing means, for preventing storage, due to the beam of said one writing gun, of charges corresponding to targets within bearing limits which embrace said relatively small portion; means for additionally deflecting the beam of said other writing gun to position said co-ordinate charge representation within the part of said storage electrode on which charges, due to the beam of said one writing gun and corresponding to targets within said bearing limits, would, but for said prevention means, have been stored; and means, including means for operating said reading gun, for providing a display corresponding to the stored charges.

Preferably, the means for preventing storage of charges corresponding to targets within said bearing limits comprise means for applying, to cut-off said one writing beam, blanking pulses corresponding as respects timing and duration, to the position and extent of the zone embraced by said bearing limits.

The invention, as so far described, has the advantages that it provides, in a single display tube, information regarding collision courses and other information and also that it can readily be used to make the displays available at one or more viewing points remote from the radar set proper. In some cases, however, it may be regarded as acceptable, or even preferred, to provide one display tube giving information regarding collision courses and another providing all round radar information such as a P.P.I. display and further features of the invention now to be described enable this to be done though it will be appreciated that, if this is done, there will be the disadvantage that, assuming only a single watch-keeping officer is on duty he may, as a result of having to divide his attention between two tubes, miss information or fail to observe it as early as is desirable unless he takes particular care not to do so.

According to a further feature of this invention a radar set comprises an electron discharge storage tube having a signal electrode adapted to provide output signals corresponding to signals stored in said tube, means for applying to said tube for storage therein signals derived from targets within a relatively small portion of the coverage of said set, means for moving the position of said relatively small portion within said coverage, and means for displaying, in response to said output signals, targets within said relatively small portion.

According to another feature of this invention a radar set comprises a direct viewing storage display tube, means for displaying on the screen of said tube echo signals derived from targets within a relatively small portion of the coverage of said set, and means for moving said relatively small portion to any desired position within said coverage. The said relatively small portion is (as is also the case with the features of invention herein before described) a portion lying within a relatively small angle of bearing (for example 15° to 20°) and a relatively small zone of ranges (for example a few miles) and is separately movable in range and in bearing.

Preferably the direct viewing storage tube employed in accordance with the last described feature of this invention is arranged to provide a so-called B-scan co-ordinate display with one co-ordinate corresponding to bearings and the other to ranges. The relatively small portion may be adjustable as to the separation of the limits of the small zone of ranges and/or as to the separation of the limits of the small angle of bearings.

Finally, according to another feature of this invention a radar set comprises means for scanning space with periodic radio pulses to derive echo signals from targets within said space; a receiver for receiving said echo signals; a main display tube operated from said receiver and arranged to display said targets on its screen in positions whose bearings in relation to the origin of the display and whose distances from said origin correspond respectively to the bearings and ranges of the targets from which said echo signals are received; a direct viewing storage tube having co-ordinate scanning means associated with its "writing" gun; first time base means for linearly deflecting the writing beam of said storage tube in one co-ordinate deflection direction; means actuated at the repetition frequency of said radio pulses and with an adjustable time delay with respect thereto for actuating said time base means; second time base means for linearly deflecting said writing beam in the other co-ordinate deflection direction; means actuated at the bearing repetition frequency of scanning by said radio pulses and at an adjustable phase relation thereto for actuating said second time base means; means for producing range pulses of predetermined length simultaneously with actuation of said first time base means; means for producing bearing pulses of predetermined length simultaneously with actuation of said second time base means; means for gating said range pulses by selected ones of said bearing pulses so that said gating means passes said range pulses only during the existence of said selected bearing pulses; means for applying the passed range pulses to one modulating electrode of the writing gun of the storage tube; means for passing video signals derived from the receiver to another modulating electrode of the writing gun of the storage tube; and means conjointly actuated by the range pulses and the bearing pulses for superimposing, on the signals fed to the main display tube from the receiver, signals adapted to produce in the display by said main display tube an outline covering a range zone determined by the length of the range pulses and a bearing zone determined by the length of the bearing pulses, the radial position of said outline being determined by the adjustment of said time delay and its position circumferentially being determined by the adjustment of said phase relation.

Preferably adjustable counter means are provided for selecting at will bearing pulses which occur at one or another of a plurality of multiples (including unity) of the bearing pulse repetition period, the selected bearing pulses being used to gate said range pulses.

Means may be provided for adjusting the length of the range pulses and/or of the bearing pulses.

Preferably means are provided for generating partial erasure pulses at the radio pulse repetition frequency and applying them to the backing electrode of the storage tube. Preferably these pulses are adjustable in amplitude.

The means for producing display of the aforesaid outline by the main display tube may comprise a first gate fed with range pulses and gated by bearing pulses; a double pulser fed with output from said gate and adapted to produce, from each pulse passed thereby, two short pulses of the same polarity and corresponding to the leading and trailing edges of the passed pulse; a second double pulser fed with bearing pulses and adapted to produce from each of them two short pulses of the same polarity and corresponding to the leading and trailing edges of the bearing pulse; rectangular pulse means for producing from each short pulse from the second double pulser a pulse of length substantially equal to the radio pulse repetition period; a second gate fed with range pulses and gated by the pulses from the rectangular pulse means; a mixer having two inputs one fed from each of the two gates; and means for superimposing on the video signals fed from the receiver to the main display tube output signals from said mixer.

The invention envisages the provision of conversion equipment adapted to be added to and connected to the equipment of existing P.P.I. display radar sets to convert them into radar sets in accordance with this invention and as hereinbefore described.

Figure 4:
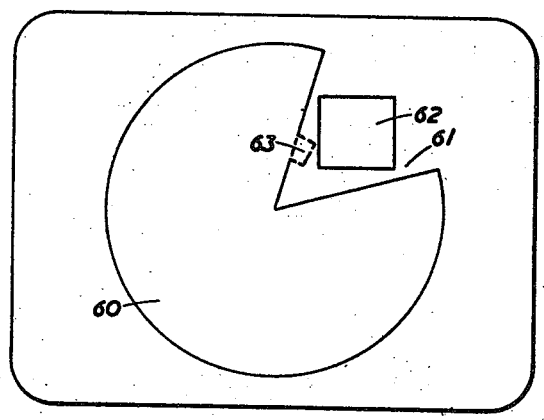

The invention is illustrated in and further described with reference to the accompanying drawings. In these drawings FIG. 1 is a block diagram of one embodiment using a direct viewing storage tube and FIGURE 2 is a graphical explanatory figure showing conventionally pulses and waveforms obtained at different parts of the apparatus of FIGURE 1. The different lines of FIGURE 2 are referenced in correspondence with the references applied in FIGURE 1 to the parts whose outputs are represented in FIGURE 2. FIGURE 3 illustrates a preferred embodiment and FIG. 4 illustrates a typical form of display obtained from the embodiment of FIG. 3.

The radar equipment represented in FIGURE 1 comprises the usual transmitter 1 which is pulsed at a predetermined pulse repetition by pulses 2 (FIGURE 2) supplied by a master pulse source 2. The pulses of radio frequency from the transmitter 1 are fed through a transmit-receive (T.R.) cell 3 to a transmitting-receiving aerial system 4 of any suitable known form which is rotated in azimuth in the customary way by a motor M. This motor also rotates the magnetic deflecting coil system 5 of a P.P.I. display tube 6 in synchronism with the aerial rotation. The circle forming part of the representation of the tube 6 represents the screen of the tube. Echo signals from the aerial are fed through the T.R. cell 3 to a receiver 7 whose video output is fed to the "brightening" electrode (not separately shown) of the tube 6. Pulses from the pulse source 2 are also fed as triggering pulses to a range time-base 8 whose output, represented at 8 in FIGURE 2, is fed to the deflecting coil system 5 of the display tube 6. As so far described the equipment is that of an ordinary well known P.P.I. display radar set. To this is added equipment in accordance with this invention and now to be described. As will be seen later this added equipment enables a desired area, such as the area 9, to be displayed, enlarged, on the screen of a so-called direct viewing storage tube 10 in such a manner as to enable a viewer to see, very easily and quickly, whether or not any target displayed in that area is on a collision course, i.e. is moving in such manner as to maintain a constant bearing from the ship carrying the radar equipment. In the example illustrated, the area 9 is bounded by two radii defining a small zone of bearing (e.g. 15°) and two concentric arcs defining a small zone of ranges, e.g. 2 miles, and is displayed by the tube 10 in perpendicular co-ordinate fashion. The said area 9 may be made adjustable in respect of its radial length and/or of its arcuate extent but, in usual practice, a fixed pre-set radial length and a fixed pre-set embraced arc will be adopted for it. It is, however, movable both radially and circumferentially to any desired position on the display screen of the tube 6, and, as will be seen later, the position it occupies at any time is shown by an outline forming part of the display by said screen.

Pulses from the source 2 are fed to an adjustable delay unit 11 which can delay them by any desired amount less than the pulse repetition period. The delay pulses, represents at 11 in FIGURE 2, trigger a pulse generator 12 which produces from each delay pulse a rectangular pulse (12 of FIGURE 2) which may be of adjustable length but is preferably of pre-set length corresponding, for example, to a range length (radial length of area 9) of 2 miles. These rectangular range pulses are fed to and actuate a Y time-base generator 13 for Y-co-ordinate deflection in the direct viewing storage tube 10. The output from the time-base 13 is shown at 13 in FIGURE 2.

The motor M also operates any convenient form of switch which is adapted to close its contacts once in each revolution in azimuth, i.e. the switch is closed at the bearing repetition frequency of scanning by the radio pulses. The switch is such that the point of closure can be adjusted round the azimuth circle, i.e. the phase relation to the bearing repetition frequency is adjustable. The switch is represented as comprising an insulated drum with a single conducting sector 14 and a brush 15 carried by a manually rotatable ring 16. The drum is driven by the motor M (the chain lines in FIGURE 1 represent driving couplings) and, as will be seen, the leads 17 are connected together once during each rotation of the aerial 4 at an instant determined by the position, in rotational adjustment, of the ring 16. Closure of the switch triggers a pulse generator 18 to produce a bearing pulse which may be of adjustable length but is preferably of preset length corresponding to a desired arc of bearing, e.g. of length corresponding to the time taken by the aerial 4 to move through 20° of arc. The pulses from unit 18 are represented at 18 in FIGURE 2.

The bearing pulses 18 are fed to a variable divider or counter 19 which can be adjusted to divide by any one of a desired number of integers including unity and extending up to, say 10. Thus the unit 19 could, for example, be adjusted to divide by 1 (passing all the pulses 18) or 2 (passing alternate pulses 18) or 4 (passing every fourth pulse 18) or 8 (passing every eight pulse 18). The divided pulsed output from divider 19 is used to control a gate 20 to which the pulses 12 are fed, "opening" the gate at and during each output pulse from the divider 19. Thus range pulses 12 can be arranged to be passed by gate 20 during a predetermined arc of aerial azimuth either during each circle of rotation of the aerial, or during alternate circles, or during every fourth circle or during every eighth circle (for example).

The pulses 13 also trigger an X time base generator 21 for X-co-ordinate deflection in the direct viewing storage tube 10. The output from time-base 21 is represented at 21 in FIGURE 2.

Range pulses 12 are also fed to a gate 22 which is "opened" by and during the bearing pulses 18 giving an output as shown by line 22 of FIGURE 2. This output is fed to what may be termed a pulse doubler 23 which may be of any known form—for example a differentiating circuit and a circuit adapted to invert each alternate differentiated pulse—adapted to produce a short pulse of the same polarity from each leading and trailing edge of a pulse from 22. The output from the pulse doubler 23 is represented at line 23 of FIGURE 2. The pulses 23 are fed as one input to a mixer 24.

Pulses 18 are also fed to a pulse doubler 25, like the doubler 23 and producing an output as shown in line 25 of FIGURE 2. This output triggers a rectangular pulse generator 26 which produces from each input pulse thereto and as shown in line 26 of FIGURE 2, a rectangular pulse of width equal to one period of the pulse repetition frequency from the source 2. These pulses 26 are fed as gating pulses to a gate 27 fed with the range pulses 12 and providing the second input to the mixer 24. This input is shown at line 27 in FIGURE 2. The output from this mixer 24 is superimposed via lead 28 on the video signals fed from the receiver 7 to the P.P.I. display tube 6 which will accordingly include in its display an area outline 9 in a position determined in bearing (circularly) by the adjustment of the ring 16 and in range (radially) by the adjustment of the delay unit 11.

The direct viewing storage tube 10 is of known type and represented purely diagrammatically. It includes the usual backing electrode (not separately shown) associated with its fluorescent screen, a "writing" gun unit including a cathode modulator 29, and a grid modulator 30, X deflector plates 31, Y deflector plates 32, and a "flood" gun 33. Output from the gate 20 is fed to the cathode modulator 29; output from the time bases 21 and 13 are fed to the X and Y deflector plates 31 and 32 respectively; and a separate video output from the receiver 7, amplified by a video amplifier 34, is fed to the grid modulator 30. Accordingly the tube 10 will produce on its screen an enlarged quasi permanent display, in perpendicular co-ordinates, of that part of the display on the screen of the tube 6 which corresponds to the area 9. The display on the tube 10 is of the so-called B-scan type within a rectangular area represented at 35 of which one side corresponds to the arcuate extent of the area 9 and the other corresponds to the radial dimension of said area. The direct view storage tube 10 of course retains its display (until erased) and accordingly the successive positions of a target in the storage tube display will be shown by retained flowing dots. If, with the forms of display shown, these dots are in a straight line parallel to the Y-axis of the display on the storage tube, the target giving rise to the dots is on a collision course. Accordingly the navigating officer can see very quickly, and without any plotting, whether any particular target is on a collision course or not and can act accordingly.

Preferably, and as shown, there is also provided a pulse generator 36, triggered by pulses from the source 2 and providing pulses at the pulse repetition frequency and preferably of manually adjustable amplitude. These pulses are applied as partial erasure pulses over lead 37 to the backing electrode of the tube 10. By suitably adjusting these pulses in amplitude the result may be achieved that the last target dot to be "written" on the screen of the tube 10 is the brightest, the last but one dot written is less bright, the last but two dot is written less bright . . . and so on. The effect obtained is that any line of dots due to the same target will show a bright "head" with a "tail" of diminishing brightness. The apparatus in unit 36 also includes means, operable at will, for applying a pulse of suitable amplitude and length completely to erase, in known manner, the display on the tube 10.

Block 38 represents any means, known per se, for producing so-called marker potentials for superimposition on the signals fed to the grid modulator 30 and to the tube 6 and adapted to include desired marker indications, e.g. range ring lines, in the displays produced by the two tubes.

In the illustrated embodiment the main display tube 6 is shown as of the type having a rotating deflector coil system and the storage tube is shown as of the electrostatically deflected type. Obviously, however, a fixed deflector coil system with circular deflection obtained electrically by selsyn or similar equipment synchronized with aerial rotation as well known per se could be used for the tube 6 and either electro-static or electro-magnetic deflection could be employed for the tube 6 or for the tube 10. Also the P.P.I. display by the tube 6 could be arranged in accordance with well known radar practice, to be either of the "ship's head up" type or of the "stabilized" type, e.g. "North up." The invention is also obviously equally well applicable to radar sets of the so-called "true motion P.P.I." type, i.e. of the type in which the origin of the P.P.I. display is not fixed at the centre of the screen but moves across the screen in accordance with the movements of the ship carrying the radar equipment. All these variations of ordinary P.P.I. radar sets are too well known to require description here and the present invention is applicable with like advantages to all of them.

It will be noted that the apparatus included in the equipment of FIG. 1 for the special purpose of this invention is additional to that normally provided in known radar sets and is of such nature to lend itself to the ready modification of existing radar equipments.

The operating advantages of radar sets as illustrated in FIG. 1 as compared with ordinary radar sets which require the navigating officer to plot the course of other ships in order to navigate with seaman-like attention to the risk of collision, are obviously great. In the first such experimental embodiment built and tested it was found that a navigating officer could in practice, predict the relative course of an indicated displayed target ship at a range of 12 miles in as little as 1½ minutes.

It is of considerable practical advantage to provide for use in association with the viewing screen of the direct viewing storage tube in FIG. 1 a scale calibrated in terms of the nearest approach for any given range. By laying this scale along the line of approach of a target as displayed on the storage tube screen, the navigating officer can determine at a comparatively early stage the distance of nearest approach to the target and can navigate accordingly, altering course as may be requisite to avoid an approach which is too close for practical safety.

Referring now to FIG. 3 the radar equipment therein represented comprises the usual transmitter 1 which is pulsed at a predetermined pulse repetition by pulses supplied by a master pulse source 2. The pulses of radio frequency from the transmitter 1 are fed through a transmit-receive (T.R.) cell 3 to a transmitting-receiving aerial system 4 of any suitable known form which is rotated in azimuth in the customary way by a motor M.

An electron discharge storage tube 50, which may be as known per se, has two writing electron guns, schematically represented by the rectangles 53 and 54, a reading electron gun 55 and a storage electrode 51, which may comprise a metal grid or mesh with insulation material deposited on the wires thereof on the side nearer the electron guns and adapted to be relatively positively charged at areas impinged by either of the electron beams from writing guns 53 and 54 and to modulate the electron beam from the reading gun 55 in dependence on the stored charges. Collector grid 52 collects secondary electrons emitted by the storage electrode 51 when it is impinged by the writing beams and electrons of the reading beam which are turned back at the storage electrode. The signal plate 49 is positioned to receive electrons of the reading beam passing through the interstices of the storage electrode and is adapted to provide signals corresponding to the charge distribution on the storage electrode. The signal plate 49 may be replaced by a fluorescent screen, having the usual backing electrode, in which case the reading beam will be a flooding beam. Preferably, however, a signal plate is used and the reading beam is a pencil-like beam which is scanned, as described hereafter, across the storage electrode. Operating potentials are applied to the tube in accordance with practice which is sufficiently well-known not to require elaboration here.

The motor M also rotates the magnetic deflection coil system 5, which is operative to deflect the writing beam from the gun 53 in synchronism with the aerial rotation and echo signals from the aerial are fed through the T.R. cell 3 to a receiver 7 whose video output is fed as "brightening" voltage to the grid modulator 153 of the writing gun 53 of tube 50. Pulses from the pulse source 2 are also fed as triggering pulses to a range time base 8 whose sawtooth output wave is fed to the deflection coil system 5 associated with the writing gun 53. With this arrangement the writing beam from gun 53 is arranged to provide a charge representation on the storage electrode 51 of tube 50 corresponding to the well-known P.P.I. display. Such a display may be obtained as described hereafter or, where the storage tube 50 is provided with a fluorescent screen and a continuously operating "flooding" reading gun, on that fluorescent screen by means of the modulated "flooding" beam passing through the storage electrode 51.

Equipment, which will be described hereafter, enables a desired relatively small part of the coverage of the radar set to be displayed, enlarged, in such manner as to enable a viewer to see, very easily and quickly, whether or not any target displayed in that area is on a collision course, i.e. is moving in such manner as to maintain a constant bearing from the ship carrying the radar equipment. In the illustrated case the aforesaid small part of the coverage of the set is defined by a small zone of bearing (e.g. 15°) and a small zone of ranges (e.g. 2 miles) and is displayed in perpendicular co-ordinate fashion. The said small part of the radar set coverage may be made adjustable in respect of the extent of its zones of bearing and range but, in usual practice, these are pre-set. It is, however, movable both as respects bearing and range to any desired position within the coverage of the set.

Pulses from the source 2 are fed to an adjustable delay unit 11 which can delay them by any desired amount less than the pulse repetition period. The delayed pulses trigger a pulse generator 12 which produces from each delayed pulse a rectangular pulse which may be of adjustable length but is preferably of pre-set length corresponding, for example, to a range length of 2 miles. These rectangular range pulses are fed to and actuate a Y timebase generator 13, which produces sawtooth waves at the frequency of the range pulses, for Y-co-ordinate deflection for the beam of writing gun 54.

The motor M also operates any convenient form of switch which is adapted to close its contacts once in each revolution in azimuth, i.e. the switch is closed at the bearing repetition frequency of scanning by the radio pulses. The switch is such that the point of closure can be adjusted round the azimuth circle, i.e. the phase relation to the bearing repetition frequency is adjustable. The switch is represented as comprising an insulated drum with a single conductive sector 14 and a brush 15 carried by a manually rotatable ring 16. The drum is driven by the motor M (the chain lines in FIGURE 3 represent driving couplings) and, as will be seen, the leads 17 are connected together once during each rotation of the aerial 4 at an instant determined by the position, in rotational adjustment, of the ring 16. Closure of the switch triggers a pulse generator 18 to produce a rectangular bearing pulse which may be of adjustable length but is preferably of preset length corresponding to a desired arc of bearing, e.g. of length corresponding to the time taken by the aerial 4 to move through 20° of arc.

The bearing pulses from unit 18 are fed to a variable divider or counter 19 which can be adjusted to divide by any one of a desired number of integers including unity and extending up to, say, 10. Thus the unit could, for example, be adjusted to divide by 1 (passing all the pulses from unit 18) or 2 (passing alternate pulses) or 4 (passing every fourth pulse) or 8 (passing every eighth pulse). The divided pulsed output from divider 19 is used to control a gate 20 to which the pulses from unit 12 are fed, "opening" the gate at and during each output pulse from the divider 19. Thus range pulses from unit 12 can be arranged to be passed by gate 20 during a predetermined arc of aerial azimuth either during each circle of rotation of the aerial, or during alternate circles, or during every fourth circle or during every eighth circle (for example).

The pulses 18 also trigger an X time base generator 21 to produce a sawtooth waveform having the same duration as the pulses from unit 18 for X-co-ordinate deflection of the beam from gun 54.

Output from the gate 20 is applied, via a switch 39, to the cathode modulator 254 and video signals from receiver 7, amplified by a video amplifier 34, are applied to the grid modulator 154 of writing gun 54, both the output pulses from the gate 20 and the video signals from amplifier 34 being of positive polarity and the arrangement being such that the writing beam is cut-off except when video signals and an output pulse from gate 20 are simultaneously applied to the gun. Output from the time bases 21 and 13 are fed to the X and Y deflector coils, respectively, of the coil arrangement 31 which serves to provide two mutually perpendicular deflections of the beam from writing gun 54. Accordingly, a charge pattern is established on the storage electrode 51 which is similar in form to the so-called B-scan display which covers a rectangular area, of which one side corresponds to the zone of bearings occupied by the selected, relatively small, portion of the coverage of the set and the other corresponds to the zone of ranges of said portion.

As so far described the arrangement is similar to that of FIGURE 1, with the modification that the display tube 6 and direct view storage tube 10 of the arrangement of FIG. 1 are replaced by the storage tube 50, with the writing guns 53 and 54 receiving signals which were previously applied to the gun of the display tube 6 and the gun of the direct view storage tube 10, respectively, of the aforesaid FIGURE 1.

As so far described the present arrangement will provide on the storage electrode 51, a circular charge pattern, corresponding to a P.P.I. display, and a rectangular charge pattern corresponding to a display in which targets maintaining collision courses with respect to the radar set will give rise to a trace parallel to the Y-axis. If desired the two charge patterns may be positioned side by side, but such arrangement results in a considerable area of the storage electrode surface being unused and is not preferred. In the preferred, and illustrated, arrangement when it is desired to display collision-warning information the storage of charges by the writing beam of gun 53, and corresponding to target information from within bearing limits which are so chosen as to include the small portion of the set coverage for which such collision-warning information is required, is prevented and the rectangular charge pattern corresponding to collision warning information is provided within the area in which said storage is prevented.

Closure of the contacts 14 and 15 of the rotating switch is also arranged to trigger a further pulse generator 56, which is adapted to produce a rectangular output pulse commencing at the same time as the corresponding pulse from pulse generator 18 but of longer duration and of negative sense. The pulse from pulse generator 56 is applied via the switch 39', which is ganged with switch 39, the two being closed when it is desired to display collision-warning information, to the cathode modulator 253 of writing gun 53 and serves to cut-off the beam from that gun. An additional deflection coil 57 has applied thereto a constant potential from a source of such potential 58 which deflects the writing beam from the gun 54 radially to a desired position on the storage electrode. Coil 57 is also rotatable about the neck of the tube carrying the gun 54 and is mechanically connected to be rotated by an external ring 59 which surrounds the manually rotatable ring 16 and is fixed thereto. With this arrangement the coil 57 is rotated to such a position that the rectangular charge pattern on the storage electrode 51 due to the beam from gun 54 is always positioned, preferably centrally, within the arc in which the storage of charges due to the other writing beam is prevented by the application of the output pulse from pulse generator 56. If the length of the output pulse unit 18 is not predetermined but is made adjustable the ring 59 may be arranged so that it is rotatable with respect to the ring 16, whereby adjustment of the deflection of the writing beam from gun 54 may be made. The duration of the output pulse from pulse generator 56 is, of course, so chosen that the rectangular charge pattern due to the beam from gun 54 always falls wholly within the sector of the storage electrode on which charge deposition by the beam from gun 53 is prevented.

Pulse generator 40 is arranged to provide synchronising pulses, at a frequency such as is used for line scanning in television, and these synchronising pulses are applied to line scan generator 42 to provide X-deflection line scanning sawtooth waves which are applied to the deflection coil arrangement 48 associated with the reading gun 55 to deflect the reading beam across the storage electrode 51. Pulses from generator 40 are applied to the divider 41 which produces output pulses at a desired frame scan frequency, these output pulses being applied to frame scan generator 43 whose output is applied to coil 48 for Y-deflection. Pulses from generator 40 and divider 41 are both fed to a blanking pulse generator 44 which is arranged in well known manner to provide output pulses during the flyback periods of the line and frame deflection waves applied to deflect the reading beam of gun 55. These output blanking pulses are applied to the storage electrode 51 and are such as to cause partial erasure of the charge patterns on that electrode during the blanking periods. In this way, the more recent the radar information presented in the final display, the brighter will the display thereof be.

Output video signals from the signal plate 49 of tube 50 and which correspond to the charge pattern on the storage electrode are amplified in video amplifier 47 and applied, together with line and frame synchronising pulses from units 40 and 41 respectively and suitable blanking pulses from unit 44, to one or more remote television type display cathode ray tubes such as are well known per se and require no further description here.

If desired, and as illustrated, a potential source 45 may be provided to apply variable potential to a modulator grid 155 of reading gun 55 to provide control of the intensity of the reading beam.

FIGURE 4 which illustrates the face of a cathode ray display tube on which the final display is provided shows a typical display which might be obtained with the above described arrangement, in which reference 60 denotes the normal P.P.I. type display, reference 61 is applied to the sector in which the P.P.I. display is prevented, reference 62 denotes the collision warning information display and the area 63 (shown dotted) is a typical area (referred to the P.P.I. display) for which collision warning information is displayed.

If desired equipment, known per se, may be provided to denote on the P.P.I. display, before switches 39 and 39' are closed to give display of collision warning information, the part of the coverage of the radar set to which said collision warning information relates.

I claim:

1. A radar set comprising means for scanning space with periodic radio pulses to derive echoes from targets within said space, a receiver for receiving said echoes, a first display screen portion, means responsive to said receiver for displaying on said first display screen portion echo signals from said targets in positions having bearings in relation to the origin of the display and having distances from said origin corresponding respectively to the bearings and ranges of the targets from which said echoes are received, a second display screen portion, means comprising an electron beam and responsive to said receiver for displaying on said second display screen portion echo signals from targets within a relatively small portion of the coverage of said radar set, first time-base means for deflecting said electron beam in one co-ordinate direction of a planar coordinate system, means actuated at the repetition frequency of said radio pulses and including an adjustable time delay for actuating said time-base means, second time-base means for deflecting said electron beam in the other coordinate direction of said coordinate system, actuating means actuated at the bearing repetition frequency of the scanning performed by said radio pulses and at an adjustable phase relation thereto for actuating said second time-base means, means for producing range pulses of predetermined length simultaneously with actuation of said first time-base means, means for producing bearing pulses of predetermined length simultaneously with actuation of said second time-base means, means for selecting certain ones of said bearing pulses, gating means for giving an output when coincidence exists between the selected bearing pulses and the range pulses, and modulating means for modulating said electron beam in accordance with the output from the gating means and with the video signals from the receiver, the extent of said relatively small portion being determined in range by the length of the range pulses and in bearing by the length of the bearing pulses, the position of the relatively small portion being determined radially by the adjustment of said time delay and circumferentially by the adjustment of said phase relation produced by said actuating means.

2. A radar set as claimed in claim 1, wherein there is provided storage means for storing signals displayed on said second screen portion.

3. A radar set as claimed in claim 2, wherein said storage means comprises a direct view storage tube having a storage electrode, said second display screen portion comprising at least a portion of the display screen of the storage tube, upon which screen are displayed signals stored on the storage electrode.

4. A radar set as claimed in claim 3, wherein said first display screen portion comprises a portion of the direct view storage tube, said radar set including means for preventing storage of said first mentioned echo signals from targets within at least a portion of the coverage of the radar set and for initiating storage of echo signals from targets within said relatively small portion on the part of the storage electrode on which storage of said first mentioned signals is prevented.

5. A radar set as claimed in claim 3 wherein said first-mentioned echo signals and said echo signals from targets within said relatively small portion are stored on different parts of the storage electrode of the tube.

6. A radar set as claimed in claim 3 wherein said first-mentioned echo signals are stored in said tube in a manner to provide polar co-ordinate display and the echo signals from targets within said relatively small portion are stored in a manner to provide rectangular co-ordinate display.

7. A radar set as claimed in claim 3 wherein the direct view storage tube is arranged to provide a B-scan co-ordinate display with one co-ordinate corresponding to bearings and the other to ranges.

8. A radar set comprising means for scanning space with periodic radio pulses to derive echo signals from targets within said space; a receiver for receiving said echo signals; an electron discharge storage tube having two writing electron guns and a reading electron gun; means for applying received signals to modulate the beam of one of said writing guns and means for deflecting said beam to store on a storage electrode of said tube a charge representation of scanned targets within the coverage of said set and corresponding as respects bearings in relation to the origin of said representation and distance therefrom to the bearings and ranges of said targets; means, including means for modulating and deflecting the beam of the other writing gun and operable at will, for storing on said storage electrode a co-ordinate charge representation of targets lying within a selectable, relatively small, portion of the coverage of said set, one co-ordinate corresponding to bearing and the other to range; means, operable conjointly with said storing means, for preventing storage, due to the beam of said one writing gun, of charges corresponding to targets within bearing limits which embrace said relatively small portion; means for additionally deflecting the beam of said other writing gun to position said co-ordinate charge representation within the part of said storage electrode on which charges, due to the beam of said one writing gun and corresponding to targets within said bearing limits, would, but for said prevention means, have been stored; and means, including means for operating said reading fun, for providing a display corresponding to the stored charges.

9. A radar set as claimed in claim 8 wherein the means for preventing storage of charges corresponding to targets within said bearing limits comprise means for applying, to cut-off said one writing beam, blanking pulses corresponding as respects timing and duration, to the position and extent of the zone embraced by said bearing limits.

10. A radar set comprising means for scanning space with periodic radio pulses to derive echo signals from targets within said space; a receiver for receiving said echo signals; a first display screen portion; means responsive to said receiver for displaying on said first display screen portion echo signals from said targets in positions whose bearings in relation to the origin of the display and whose distances from said origin correspond respectively to the bearings and ranges of the targets from which said echo signals are received; a second display screen portion; means comprising an electron beam and responsive to said receiver for displaying on said second display screen portion echo signals from targets within a relatively small portion of the coverage of said radar set; first time base means for linearly deflecting said electron beam in one co-ordinate deflection direction of a planar coordinate system; means actuated at the repetition frequency of said radio pulses and including an adjustable time delay for actuating said time base means; second time base means for linearly deflecting said electron beam in the other co-ordinate deflection direction of said coordinate system; actuating means actuated at the bearing repetition frequency of the scanning performed by said radio pulses and at an adjustable phase relation thereto for actuating said second time base means; means for producing range pulses of predetermined length simultaneously with actuation of said first time base means; means for producing bearing pulses of predetermined length simultaneously with actuation of said second time base means; means for selecting certain ones of said bearing pulses; means for gating said range pulses by the selected bearing pulses so that said gating means passes said range pulses only during the existence of said selected bearing pulses; and modulating means for modulating said electron beam in accordance with the output from the gating means and with video signals from the receiver, said modulating means including means for applying the passed range pulses to one modulating electrode of the electron gun; means for passing video signals derived from the receiver to another modulating electrode of the electron gun; and means conjointly actuated by the range pulses and the bearing pulses for superimposing on the signals fed to the first display screen portion from the receiver signals adapted to produce in the display thereof an outline covering a range zone determined by the length of the range pulses and a bearing zone determined by the length of the bearing pulses, the position of said outline radially being determined by the adjustment of said time delay and its position circumferentially being determined by the adjustment of said phase relation produced by said actuating means.

11. A radar set as claimed in claim 10 wherein adjustable counter means are provided for selecting at will for gating said range pulses by bearing pulses occurring at one of a plurality of multiples, including unity, of the bearing pulse repetition period.

12. A radar set as claimed in claim 10 wherein means are porvided for adjusting the length of the range pulses and wherein means are provided for adjusting the length of the bearing pulses.

13. A radar set as claimed in claim 10 wherein means are provided for generating partial erasure pulses at the radio pulse repetition frequency and applying them to the backing electrode of the storage tube.

14. A radar set as claimed in claim 13, wherein means are provided for adjusting the frequency of the partial erasure pulses.

15. A radar set as claimed in claim 10 wherein the means conjointly actuated by the range and bearing pulses for superimposing said outline comprise a first gate fed with range pulses and gated by bearing pulses; a double pulser fed with output from said gate and adapted to produce from each pulse passed thereby, two short pulses of the same polarity and corresponding to the leading and trailing edges of the passed pulse; a second double pulser fed with bearing pulses and adapted to produce from each of them two short pulses of the same polarity and corresponding to the leading and trailing edges of the bearing pulse; rectangular pulse means for producing from each short pulse from the second double pulser a pulse of length substantially equal to the radio pulse repetition period; a second gate fed with range pulses and gated by the pulses from the rectangular pulse means; a mixer having two inputs, one fed from each of the two gates; and means for superimposing on the video signals fed from the receiver to the first display screen portion output signals from said mixer.

References Cited by the Examiner
UNITED STATES PATENTS

| | | | |
|---|---|---|---|
| 2,649,581 | 8/53 | Tasker et al. | 343—11 |
| 2,797,412 | 6/57 | Baker | 343—11 |
| 2,991,464 | 7/61 | Greenfield | 343—11 |
| 3,009,144 | 11/61 | Landee | 343—11 |

CHESTER L. JUSTUS, *Primary Examiner.*

KATHLEEN CLAFFY, *Examiner.*